United States Patent [19]
Buckley

[11] Patent Number: 4,749,158
[45] Date of Patent: Jun. 7, 1988

[54] PORTABLE UTILITY STAND

[76] Inventor: Clifford J. Buckley, 4311 Valli Vista Road, Colorado Springs, Colo. 80915

[21] Appl. No.: 14,395

[22] Filed: Feb. 13, 1987

[51] Int. Cl.⁴ ............................................. F16M 11/32
[52] U.S. Cl. ...................................... 248/98; 248/129; 248/99
[58] Field of Search ...................... 248/99, 98, 97, 129, 248/147, 423, 407

[56] References Cited

U.S. PATENT DOCUMENTS

| | | | |
|---|---|---|---|
| 190,494 | 5/1877 | Johnson | 248/97 |
| 1,414,575 | 5/1922 | McCart | 248/97 |
| 3,771,752 | 11/1973 | Meeh | 248/99 X |
| 3,806,146 | 4/1974 | Shaw | 248/129 X |
| 3,815,933 | 6/1974 | Olson | 248/98 X |
| 3,893,699 | 7/1975 | Morris | 248/98 X |
| 4,139,029 | 2/1979 | Geraci | 248/99 X |
| 4,202,521 | 5/1980 | Harding | 248/98 |
| 4,549,748 | 10/1985 | Haley, Sr. | 248/98 X |
| 4,562,983 | 1/1986 | Klefbeck | 248/97 |

FOREIGN PATENT DOCUMENTS

1315875 12/1962 France ................................ 248/99
2133282 7/1984 United Kingdom ................ 248/99

Primary Examiner—Ramon S. Britts
Assistant Examiner—Karen J. Chotkowski
Attorney, Agent, or Firm—Dean P. Edmundson

[57] ABSTRACT

A portable light-weight utility stand is described which is very useful for supporting a trash bag in an upright manner with its top open to receive the deposit of material therein. The utility stand comprises: (a) a frame member including a bag attachment section and four leg members, (b) a platform attached to and supported by the legs below the bag attachment section, (c) a chute member pivotably attached to the frame and pivotable between first and second positions, and (d) a lid carried by the chute member and being pivotable between open and closed positions. The chute is adapted to secure the top of the open trash bag to the bag attachment section. The platform supports the bottom of the trash bag. The lid is adapted to cover the open top of the trash bag, if desired, until such time as the bag is filled, after which the filled bag may be removed from the utility stand and replaced with a fresh bag. The portable stand is easily assembled and is very sturdy.

21 Claims, 8 Drawing Sheets

PORTABLE UTILITY STAND

FIELD OF THE INVENTION

This invention relates to utility stands and carts. More particularly, this invention relates to stands for temporarily supporting a bag in an upright position with its top open to receive the deposit of trash or other material therein.

BACKGROUND OF THE INVENTION

When using conventional plastic trash or garbage bags for bagging various materials such as trash, garbage, leaves, grass clippings, etc., the most common problem which one normally encounters involves trying to support the bag with the top in an open position so that the material can be inserted into the bag easily. If the bag is set on the ground for support the top does not remain open enough to allow very much material to be placed in the bag at a time. Also, if the top of the bag is not supported in some manners it will collapse and allow material to fall out of the bag again.

The placement or insertion of material into a trash bag is difficult and inefficient because of the limited size of the bag opening. Also, once the bag is filled, the plastic bag can tear or split relatively easily when it is transported.

Placing a plastic trash bag in a standard metal or plastic trash can before filling the bag does not cure the problems of supporting the bag. Once the bag is filled there is still the problem of removing the filled bag without tearing it. This problem is enhanced when the weight of the material which has been placed in the bag exceeds the capacity of the bag. As a result, the bag can quickly tear or split when an attempt is made to remove the bag from the trash can.

Various types of stands and carts have been developed by others to support a bag while it is being filled. See, for example, U.S. Pat. Nos. 3,992,034; 725,721; 296,135; 156,506; 247,220; and 2,455,729. However, some of such devices were not intended for use with conventional plastic trash bags. Other of such devices are not suitable or effective for use with plastic trash or garbage bags. For example, some of such devices do not have sufficient integrity to withstand repeated use. Other devices do not adequately support a trash bag in proper open position as it is being filled.

None of the commercially-available devices utilize a chute to ease of access to the bag opening for placement or deposit of the waste material. Also, none of the prior devices provide a means for covering a partially filled bag. Furthermore, none of the prior devices provides for ease of removal and replacement of the plastic bag in a one-step operation.

There has not heretofore been provided a portable utility stand having the features and advantages exhibited by the utility stand of the present invention.

SUMMARY OF THE PRESENT INVENTION

In accordance with the present invention there is provided a portable light-weight utility stand which is adapted to support a conventional trash bag in an upright manner with its top open to receive the deposit of material (e.g., trash, garbage, leaves, grass clippings, etc.). The utility stand of the invention comprises:

(a) a frame member including a bag attachment section defining an opening; wherein the frame member includes four depending leg members;
(b) a platform attached to and supported by the leg members below the bag attachment section;
(c) a chute member pivotably attached to the frame member, the chute member being pivotable between a first position overlying the opening in the bag attachment section and a second position away from the bag attachment section;
(d) a lid member carried by the chute member, the lid member being pivotable between open and closed positions; wherein the lid member is adapted to cover the opening in the bag attachment section when the lid member is in the closed position.

The chute member is adapted to secure the top of the trash bag to the bag attachment section when the chute member is in its first position. The trash bag is released from the bag attachment section when the chute is pivoted to its second position. The platform is adapted to support the bottom of the trash bag.

The utility stand is easily assembled and is extremely sturdy. The trash bag is very well supported within the stand (i.e., within the area defined by the four leg members). That is, there is no danger of the stand tipping over when a full bag is supported in it. Yet when the bag is full it can be easily removed from the stand.

Two rotatable wheels can be attached to the bottom of two of the legs to facilitate mobility of the stand, if desired. A handle member is also preferably included to facilitate movement of the stand. Preferably the legs are sloped or inclined outwardly at their lower end to provide increased stability for the stand and to facilitate removal of a filled bag from the stand.

The lower portion of the chute member preferably includes ridge members which are adapted to rest on the bag attachment section when the chute is in its first position to thereby secure the top of the trash bag to the bag attachment section.

The portable utility stand of the invention is especially suited to supporting conventional plastic trash bags so that they can be filled easily. The chute member enables trash or other material to be guided directly into the bag. This makes it very easy to fill the bag with materials such as leaves or grass clippings, etc.

The portable utility stand of the invention is also very useful for supporting a plastic bag for the storage of aluminum cans or the like which are being collected by the consumer for recycling purposes. Thus, the utility stand may be placed in the garage and cans may be added to the plastic bag periodically until the bag is filled. Then a fresh bag may be placed in the utility stand to replace the filled bag.

The portable utility stand of the invention can be constructed so as to accommodate trash bags of various sizes. Typical sizes of conventional plastic trash bags are 30 gallons, 33 gallons, and 39 gallons.

The utility stand can be made from a wide variety of materials, such as metal, plastic (e.g., polyvinylchloride), wood, etc. Preferably the stand is made of tubular material such as PVC pipe which is light-weight but very strong.

Other advantages of the portable utility stand of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
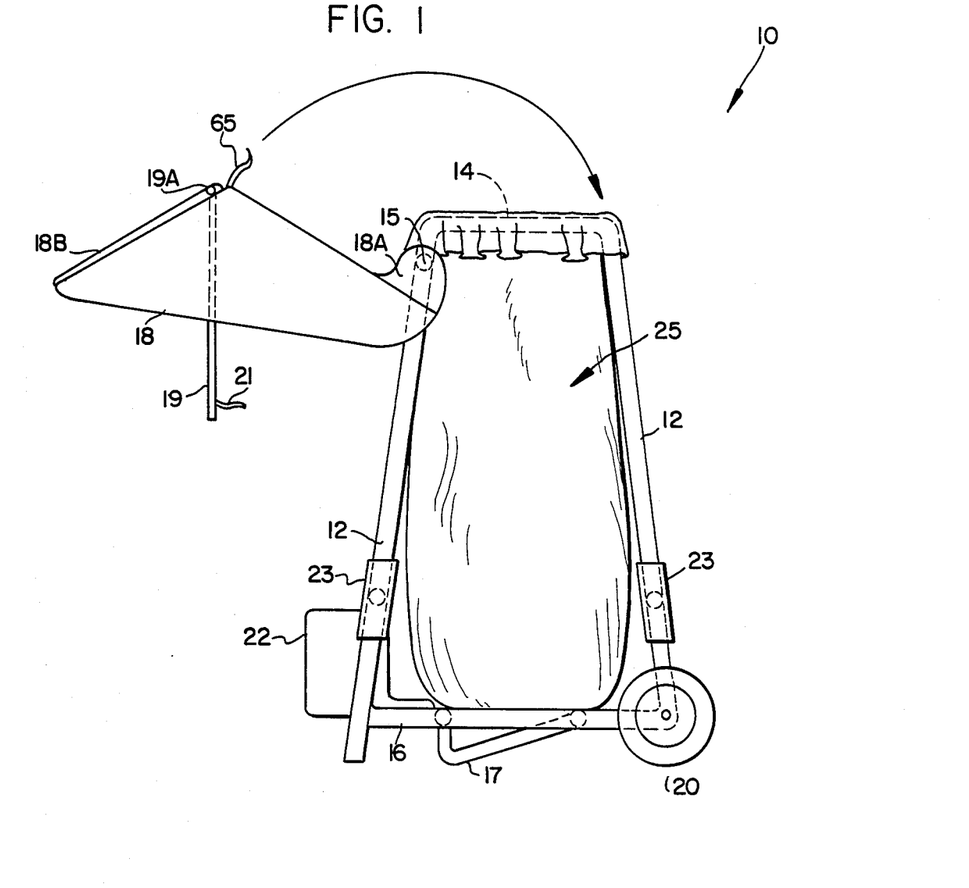
FIG. 1 is a side elevational view of one embodiment of portable ultility stand of the invention.

In FIG. 1 there is shown a side elevational view of one embodiment of portable utility stand 10 of the invention comprising elongated leg members 12, bag attachment section 14, horizontal platform 16, chute member 18, and lid 19. The lower ends of the front legs extend below the platform 16 and rest upon the ground or floor. Rotatable wheels 20 are preferably attached to the lower ends of the rear legs, as illustrated, to facilitate easy movement of the stand from one location to another. A brace member extends between the two front legs, and another extends between the two back legs. A tubular coupling 23 secures each end of each brace to each respective leg.

Support members 17 carried by platform 16 also project downwardly, as illustrated, to reach the ground or floor. These support members provide additional support for the weight of a trash bag 25 supported in the stand 10.

Container or receptacle 22 may be attached to the front of the stand, if desired, for placement of a supply of fresh trash bags and ties. The container or receptacle may be of any size and may also include a cover.

The chute member 18 is pivotably attached to the stand, as illustrated. Thus, one end 18A of the chute 18 is pivotably secured to shank 15 at the upper end of leg 12 or to a shank or support arm projecting outwardly from the bag attachment section 14.

In FIG. 1 the chute 18 is shown in its second or outward position away from the bag attachment section. Then the upper or top portion of the trash bag can be passed through the opening defined by the bag attachment section 14 and then folded over and around the bag attachment section, as illustrated. Then the chute 18 may be pivoted in the direction of the arrow to its first position where it overlies the bag attachment section. The edges of the chute member 18 secure the top edges of the trash bag to the bag attachment section so that material or debris can be guided by the chute through the opening defined by bag attachment section 14 and then into the trash bag.

Figure 2:
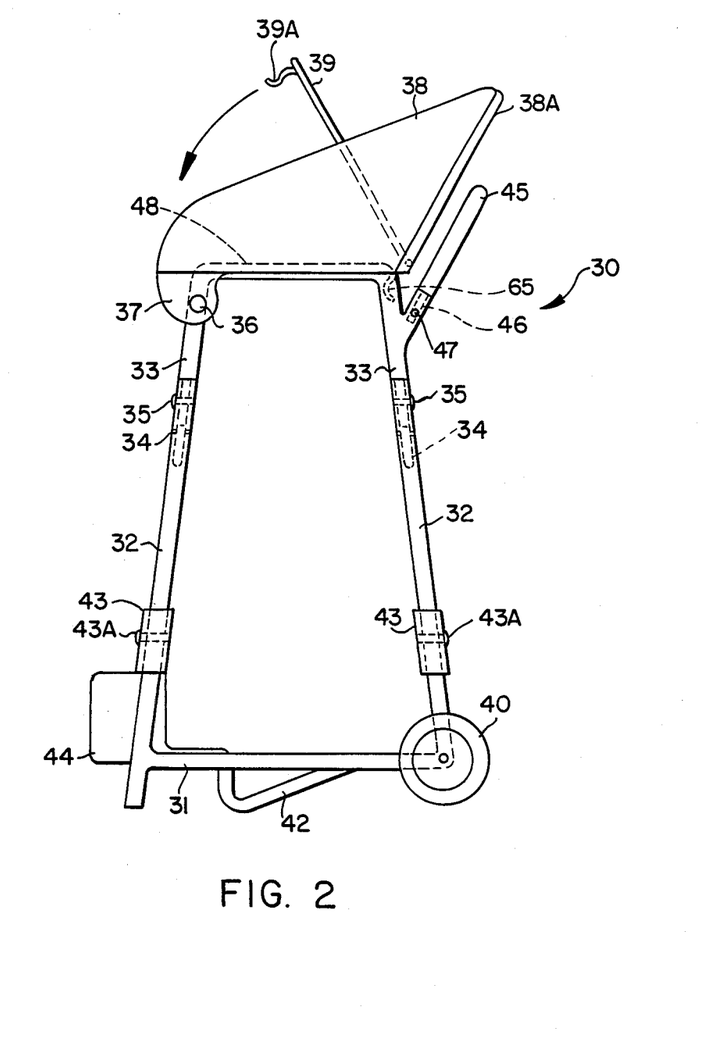
FIG. 2 is a side elevational view of another embodiment of portable utility stand of the invention.
Figure 4:
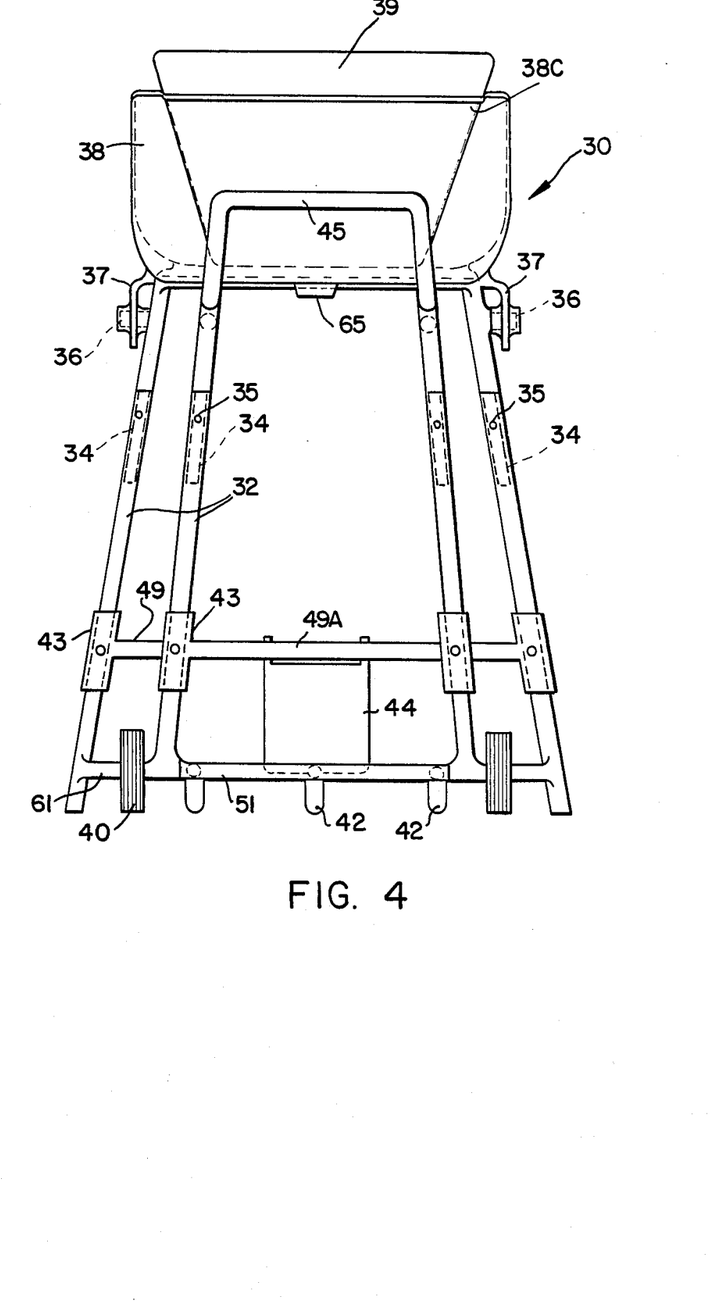
FIG. 4 is a rear elevational view of the embodiment of utility stand shown in FIG. 2.

Secured to the back edge of chute 18 is clip member 65 which is adapted to latch the chute member to the bag attachment section when the chute is in its first position. This is illustrated in FIGS. 2 and 4. The clip member is preferably made of plastic, although it could be made of metal.

Lid member 19 is pivotably attached at one end 19A to the chute 18, as illustrated. The lid 19 is movable between an open position in which it rests against the back wall 18B of chute 18 and a closed position in which it overlies the opening in the bag attachment section. Clip member 21 on the front edge of lid 19 is adapted to detachably secure the lid in its closed position to bag attachment section 14.

Thus, the lid may be raised to the open position for deposit of material into the bag 25 and then may be lowered to cover the open end of the bag 25. In this manner the utility stand of the invention may be used to support a trash bag which is being used only occasionally for the deposit of trash or other material. The lid member thus prevents cats or other small animals from getting into a partially filled trash bag. It also reduces odors emanating from a partially filled trash bag.

In FIG. 2 there is shown a side elevational view of another embodiment of portable utility stand 30 of the invention. This embodiment comprises leg members 32, a horizontal platform at each of its ends secured to a strut member 31 extending between front and rear leg members, a bag attachment section 48 at the top of the stand, and a chute member 38 which is pivotably attached at one end 37 to the shank 36 carried by the bag attachment section. Wheels 40 are rotatably attached to the lower end of the rear legs to facilitate movement of the stand.

The chute is shown overlying the opening defined by the bag attachment section. The chute may be pivoted forwardly away from the bag attachment section so as to enable a fresh trash bag to be placed in the stand or to enable release of the top of a trash bag (not shown in this figure) in the same manner as shown in FIG. 1. The lid member 39 carried by the chute 38 is pivotable between open and closed positions so as to allow the trash bag to be covered while it is supported in the stand. Clip 39A on the front edge of the lid enables the lid to be detachably secured to the bag attachment section while the lid is in the closed position.

Support members 42 attached to the underside of the platform 31 provide additional support for the trash bag while it is being filled. Container or receptacle 44 at the front of the stand is convenient for carrying fresh trash bags and ties.

A brace member extends between the two front legs and it is attached to each leg by a tubular coupling 43. Another brace member extends between the two rear legs and it is attached by similar couplings 43. Pin 43A secures each coupling 43 to each respective leg. These braces and couplings are illustrated in more detail in other figures.

Handle member 45 is detachably secured to the rear leg members, as illustrated. The handle includes a shank 46 which is adapted to be slidably received in a tubular arm projecting outwardly from the lower portion of the bag attachment section, as shown. A pin 47 is adapted to be slidably received in registering openings in the arm and the shank to hold the handle in place.

In the embodiment of utility stand shown in FIG. 2 the bag attachment section is adapted to be raised so that the utility stand can accommodate trash bags of different heights. In other words, the leg members 32 are extensible so as to raise the bag attachment section 48 with respect to the platform 31.

In the embodiment shown in FIG. 2, the lower portion 33 of the bag attachment section includes shank members 34 which are adapted to be slidably received in the top ends of the leg members 32. A pin member 35 is adapted to be inserted into registering openings in leg 32 and shank 34. To raise the bag attachment section the pins 35 are removed, thereby allowing the bag attachment section to be raised until another opening in each shank 34 is registered or aligned with the opening in each leg 32. Then the pins 35 can be inserted again.

Figure 3:
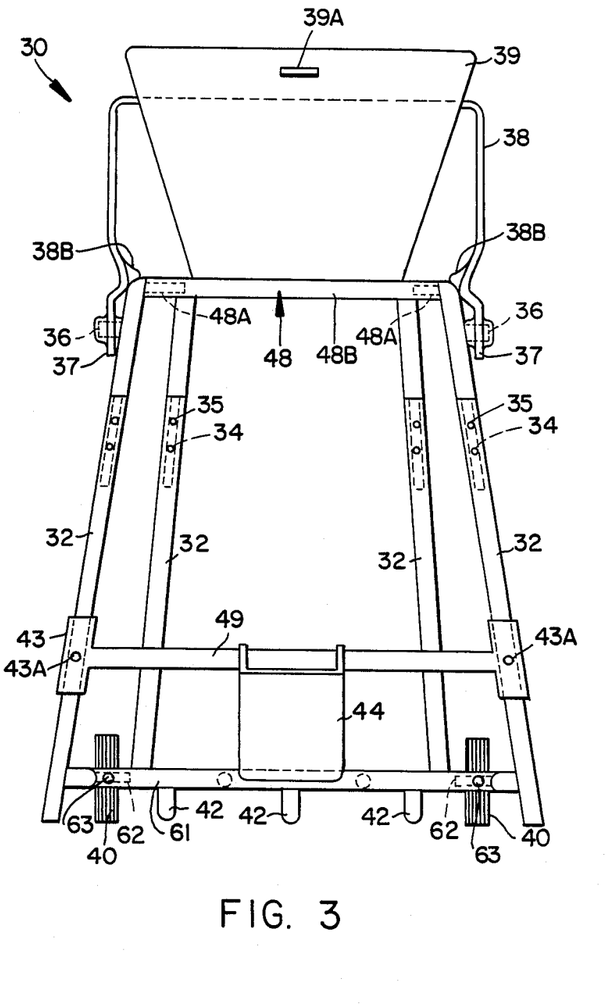
FIG. 3 is a front elevational view of the embodiment of utility stand shown in FIG. 2.

FIG. 3 is a front elevational view of the utility stand 30 shown in FIG. 2. In this view it is possible to see all four of the legs 32 and the several platform supports 42. Also visible is brace member 49 which extends between the front leg members. Pins 43A extend through registering openings in each coupling 43 and leg 32.

The lower edges of chute 38 include ridge members 38B which are adapted to rest upon the bag attachment section when the chute is in the position shown. Thus, the ridges are adapted to secure the top of the trash bag to the bag attachment section when the chute is in the position shown.

Also illustrated in FIG. 3 are shanks 48A which project inwardly from each side of the bag attachment section and extend into the ends of the tubular member 48B, as illustrated.

Also visible in FIG. 3 is one manner of securing strut member 61 to the lower ends of the front leg members 32. The lower end of each leg includes a horizontally projecting shank 62 which is adapted to project into one end of tubular strut member 61, as illustrated. Pin 63 is then inserted into registering openings in the strut 61 and the shank 62.

FIG. 4 is a rear elevational view of the utility stand shown in FIG. 2. Also visible in this view is the rear brace 49A and rear strut member 51 which extends between the two rear legs, as illustrated. The handle 45 is also shown. The back wall of the chute member illustrated here also includes a recess 38C which is adapted to receive the lid member 39 when the lid is in its open position.

Figure 5:
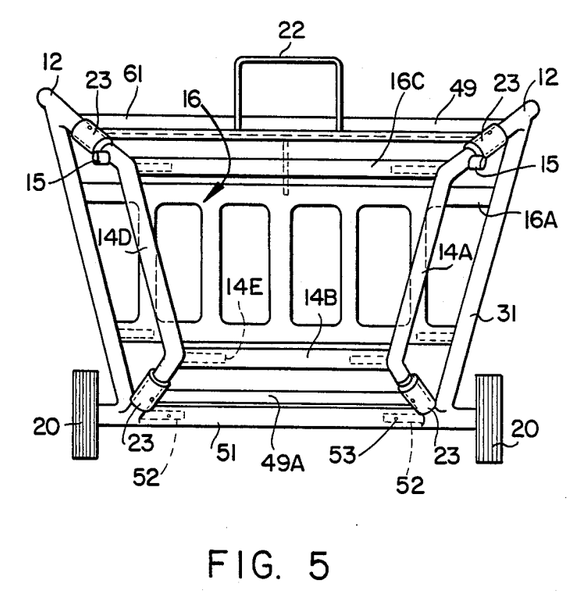
FIG. 5 is a top view of the utility stand shown in FIG. 1, without the chute member.

FIG. 5 is a top view of the utility stand shown in FIG. 1 without the chute member. In this view the bag attachment section is shown as comprising the frame formed by members 14A, 14B, 14C, and 14D which are connected to each other, as illustrated. The frame is preferably four-sided, as shown. The perimeter of this frame preferably is about 66 inches so as to accommodate conventional plastic trash bags of 33 and 39 gallon capacities. The frame, of course, could be made of different sizes to accommodate trash bags of other capacities.

The cross-sectional configuration of the bag attachment section may vary as desired. A four-sided frame is the most practical, however.

Also visible in FIG. 5 is one manner of securing strut member 51 to the lower ends of the rear leg members 32. The lower end of each leg includes a horizontally projecting shank 52 which is adapted to project into one end of tubular strut member 51, as illustrated. Pin 53 is then inserted into registering openings in the strut 51 and the shank 52.

Figure 6:
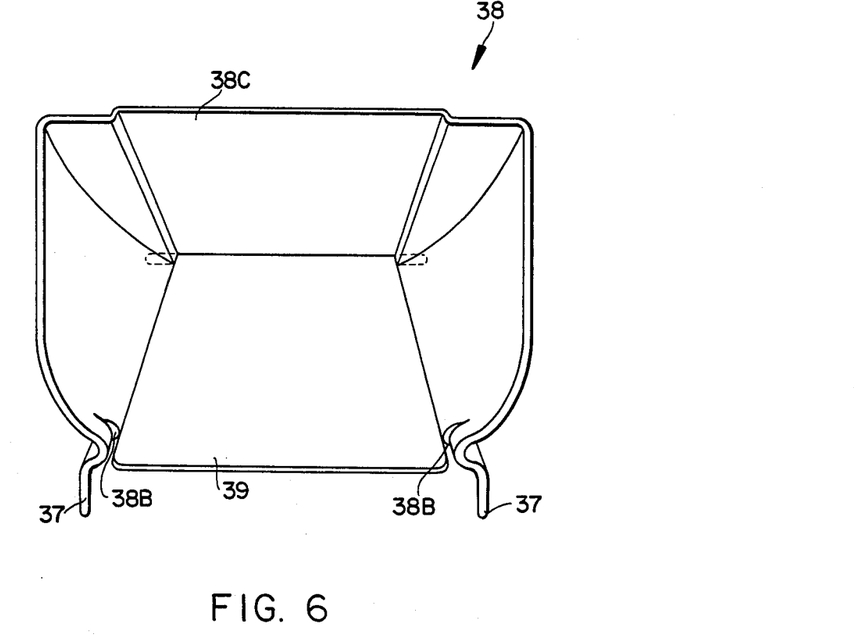
FIG. 6 is a front perspective view of the preferred chute member which is useful as a part of the portable utility stand of the invention.

FIG. 6 is a front perspective view showing a preferred embodiment of chute member 38 which is useful in the utility stands of the invention. The recess 38C in the back wall of the chute is adapted to receive lid member 39 in its open position. Ridge members 38B extend along opposite lower side edges of the chute. These ridge members are adapted to hold the top edges of the open trash bag onto the bag attachment section of the utility stand when the chute overlies the bag attachment section.

Figure 7:
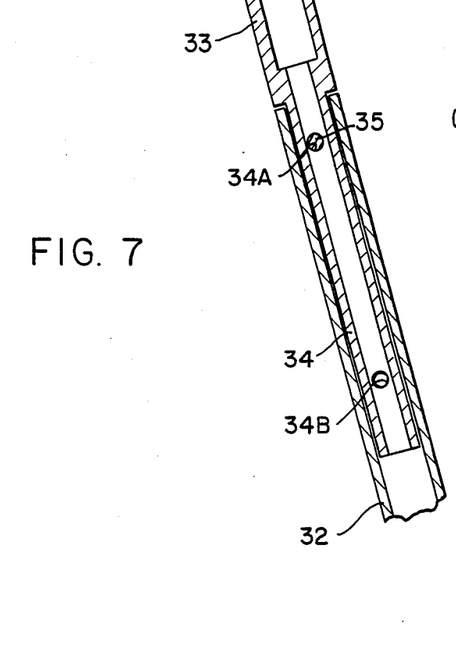
FIGS. 7 and 7A are cross-sectional views showing one manner in which the leg members are extensible.
Figure 7A:
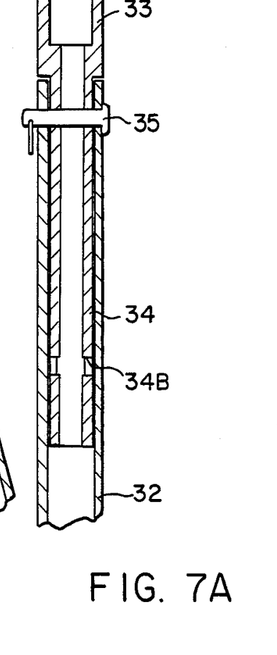

FIGS. 7 and 7A are cross-sectional views illustrating one manner in which the leg members of the utility stand can be extended or lengthened so as to place the bag attachment section at a greater height relative to the platform. Thus, there is shown shank 34 of the lower portion 33 of the bag attachment section extending into tubular leg member 32. Shank 34 includes vertically spaced apertures 34A and 34B. Pin 35 passes through apertures in tubular member 32, as illustrated. When aperture 34A in shank 34 is aligned with the apertures in tubular leg member 32, then the leg members are in their shortest position (i.e., the bag attachment section is in its lowest position). When aperture 34B in shank 34 is aligned with the apertures in leg member 32, then the leg members are in their tallest position (i.e., the bag attachment section is in its highest position) to accommodate taller trash bags.

In the embodiment shown in the drawings the leg members have two different height settings or adjustments. If desired, additional apertures may be provided in shank 34 to provide additional height settings.

Figure 8:
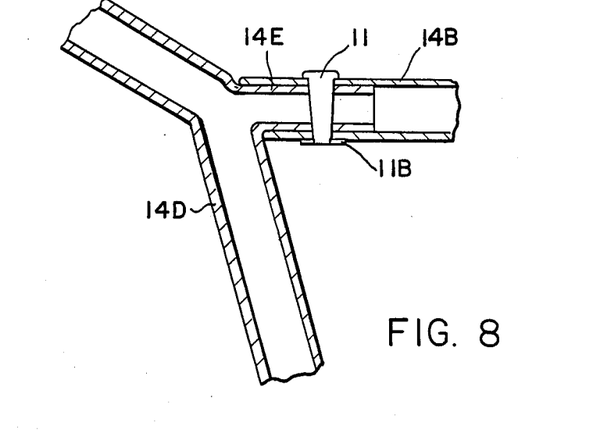
FIG. 8 is a cross-sectional view illustrating a preferred manner of interconnecting frame sections.

FIG. 8 is a cross-sectional view illustrating a preferred manner of connecting tubular members together to form the bag attachment section. Thus, tubular member 14D includes shank 14E which has an aperture extending through it. The end of tubular member 14B slidably engages shank 14E, as illustrated. Then pin 11 is inserted into registering apertures in tubular member 14B and shank 14E. Preferably the pin 11 is tapered. If desired, a clip ring or retention member 11B may be placed on the end of pin 11 to prevent it from coming out. Similar connections are made at the corners of the bag attachment section. The pin may be made of metal or impact-resistant plastic.

Figure 9:
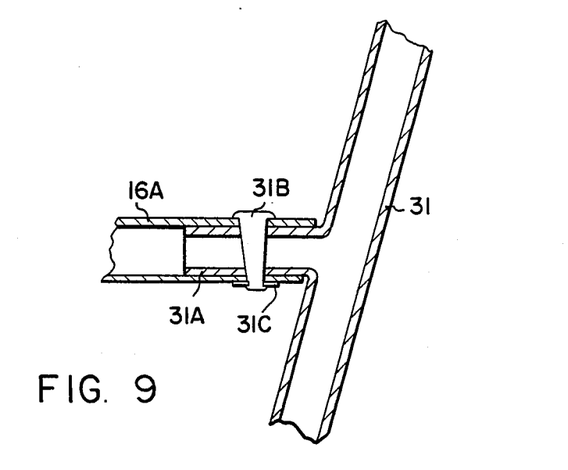
FIG. 9 is a cross-sectional view showing one manner in which various components of the utility stand of the invention can be secured together.

FIG. 9 is a cross-sectional view illustrating a preferred manner of connecting each corner 16A of the platform member to a brace or strut member 31 extending between leg members of the utility stand. Strut member 31 includes shank 31A which has an aperture extending through it. The end portion 16A of the platform member is tubular and is adapted to slide onto shank 31A, as illustrated. Pin 31B is inserted into the registering apertures of the shank and the end of the platform portion. A clip or retention member 31C may be secured to the end of pin 31B to retain the pin in place. Similar connections are made at the other corners of the platform member to secure it to the struts between the leg members.

Figure 10:
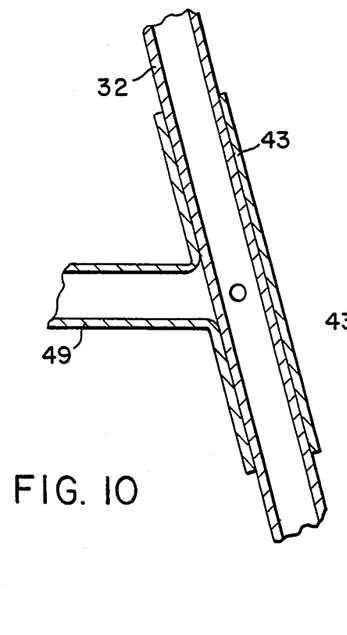
FIGS. 10 and 10A are cross-sectional views illustrating a preferred manner of securing a brace member in the utility stand of the invention.
Figure 10A:
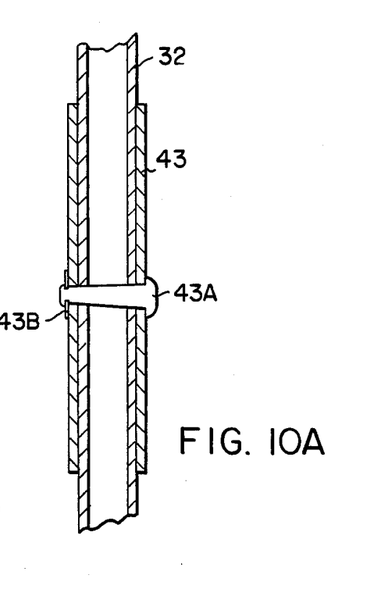

FIGS. 10 and 10A are cross-sectional views illustrating a preferred manner of securing brace member 49 to leg member 32. Tubular coupling 43 on the end of brace 49 is adapted to slide over leg 32, as illustrated. Then pin 43A is inserted into registering openings in coupling 43 and leg 32. A clip or retention member 43B may be placed on the end of pin 43A to secure it in place. Similar connections are made on the other end of brace 49 and on the ends of the other brace member 49A.

The portable utility stand of the invention can be made from a variety of materials. For example, metal (e.g., aluminum pipe or steel), plastic (e.g., polyvinylchloride or the like), wood, or other material having structural integrity sufficient to support a filled trash bag. The leg members and the bag attachment section are preferably made of tubular material which is strong and yet light-weight.

Preferably the entire utility stand of the invention is constructed from polyvinylchloride (PVC) pipe (e.g., Schedule 40 or 80 pipe having a diameter of 0.5 inch to 1.5 inches). This type of tubular material is light-weight, impact-resistant, weather-resistant, and very strong. Other types of plastic materials may be used instead of PVC so long as they have the desired physical properties, as described. Similarly, other materials may be used (e.g., aluminum pipe having a diameter of 0.5 to 1.5 inches), if desired.

The chute member is preferably made of light-weight, impact-resistant plastic such as polyethylene, polypropylene, etc. It preferably has three walls which are connected together and which slope outwardly and upwardly, as illustrated. Preferably the chute member is molded as an integral unit.

Alternatively, the chute member may be made of sheet metal instead of plastic. For example, the chute member could be constructed of aluminum or tin, etc.

The various components of the utility stand are interconnected so as to reinforce each other and provide a very sturdy assembly. Thus, the bag attachment section is securely attached to the leg members, and the braces and strut members are securely attached to the leg members. The platform is also securely attached to the strut members between the legs.

The utility stand can accommodate plastic trash bags of different sizes. Commonly available trash bags of 33 and 39 gallon capacity have an opening at the top which is approximately 66 inches in circumference. Thus, a preferred circumference for the bag attachment section is 66 inches. The utility stand can be made to handle trash bags of other sizes, if desired.

When a trash bag is filled the chute member is pivoted away from the bag attachment section and automatically frees the top of the bag. The bag may be closed and secured and removed from the utility stand by sliding the bag to one side or the other between the front and rear members. No excessive lifting is required to remove the filled bag. This procedure reduces or eliminates the tearing of trash bags which otherwise commonly occurs.

Because the lid member may be closed to cover a partially filed bag, the operation is clean, sanitary and efficient. Thus, it is not necessary to tie off partially filled bags. Also, there is no danger of tipping over or spilling a partially-filled bag.

The utility stand is also easily cleaned, if ever necessary. Use of this stand could eliminate the need for conventional trash cans.

The portable utility stand of the invention can be used in a wide variety of applications. For example, it is extremely useful for a variety of purposes around the home. It is also useful in hospitals, service stations, schools, laboratories, department stores, grocery stores, garages, workshops, etc.

The use of the utility stand of the invention also provides other significant advantages. For example, the bags may be filled to a greater extent than is possible when placing trash bags in a conventional metal trash can. Removal of the filled bag is also much easier than removing a bag from a trash can. The leg members of the stand extend outwardly and downwardly from the bag attachment section to increase stability of the stand and also allow more room for a filled bag to be removed from the stand.

Other variants are possible without departing from the scope of the present invention.

What is claimed is:

1. A portable light-weight utility stand for supporting a trash bag in an upright manner with its top open to receive the deposit of material therein, said stand comprising:
    (a) a frame member including bag attachment section defining an opening, wherein said frame member includes four depending leg members;
    (b) a platform attached to an supported by said leg members below said bag attachment section;
    (c) a chute member pivotably attached to said frame member, said chute member being pivotable between a first position overlying said opening in said bag attachment section and a second position away from said bag attachment section; wherein said chute member includes upstanding side walls and a back wall connecting said side walls;
    (d) a lid member carried by said chute member between said side walls, said lid member including first and second ends, wherein said first end of said lid member is pivotally attached to said back wall of said chute member between said side walls; said lid member being pivotable between open and closed positions; wherein said lid member is adapted to cover said opening in said bag attachment section when said lid member is in said closed position;
    wherein said chute member is adapted to secure the top of said trash bag to said bag attachment section when said chute member is in said first position; wherein said chute member is adapted to release said trash bag from said bag attachment section when said chute member is pivoted to said second position; wherein said chute member, when in said first position, is adapted to guide said material through said opening and into said trash bag; and wherein said platform is adapted to support the bottom of said trash bag.

2. A portable utility stand in accordance with claim 1, wherein said bag attachment section comprises four tubular members which are connected together to form a four-sided support defining said opening.

3. A portable utility stand in accordance with claim 1, further comprising two wheel members which are rotatably attached to the lower ends of two of said leg members.

4. A portable utility stand in accordance with claim 1, wherein said wall members are sloped outwardly and upwardly.

5. A portable utility stand in accordance with claim 1, wherein said chute member includes a lower portion which is adapted to rest on said bag attachment section when said chute member is in said first position.

6. A portable utility stand in accordance with claim 5, wherein said lower portion of said chute member includes ridge members which are adapted to rest on said bag attachment section when said chute member is in said first position to thereby secure the top of said trash bag to said bag attachment section.

7. A portable utility stand in accordance with claim 1, further comprising a latch member carried by said lid member, said latch member being adapted to detachably secure said lid member to said bag attachment section when said lid member is in said closed position.

8. A portable utility stand in accordance with claim 1, further comprising a handle member secured to said frame member.

9. A portable utility stand in accordance with claim 1, wherein said frame member, said leg members, and said platform are each composed of tubular members.

10. A portable utility stand in accordance with claim 1, wherein said chute member comprises plastic.

11. A portable utility stand in accordance with claim 1, further comprising a brace member connected between two of said leg members, said brace member including two ends, where each said end includes a tubular coupling which is adapted to slidably engage a said leg member.

12. A portable utility stand in accordance with claim 1, wherein each said leg member comprises upper and lower sections; wherein said upper section is slidably connected to said lower section in a manner such that said upper section may be raised or lowered with respect to said lower section and then secured in a manner such that said utility stand may accommodate trash bags of different heights.

13. A portable utility stand for supporting a trash bag in an upright manner with its top opening to receive the deposit of material therein, said stand comprising:
(a) a frame member including a bag attachment section and four leg members depending from said bag attachment section; wherein wheel members are rotatably attached to the lower ends of two of said leg members;
(b) a platform attached to and supported by said leg members below said bag attachment section;
(c) a chute member pivotably attached to said frame member, said chute member being pivotable between a first position overlying said opening in said bag attachment ection and a second position away from said bag attachment section; wherein said chute member includes two upstanding side wall members and a back wall member; wherein said wall members are sloped outwardly and upwardly and are adapted to guide said material through said opening and into said trash bag; wherein said chute member includes a lower portion which is adapted to rest on said bag attachment section when said chute member is in said first position;
(d) a lid member carried by said chute member between said side wall members, said lid member including first and second ends, wherein said first end of said lid member is pivotally attached to said back wall member of said chute member between said side wall members; said lid member being pivotable between open and closed positions; wherein said lid member is adapted to cover said opening in said bag attachment section when said lid member is in said closed position; wherein said chute member is adapted to secure the top of said trash bag to said bag attachment section when said chute member is in said first position; wherein said chute member is adapted to release said trash bag from said bag attachment section when said chute member is pivoted to said second position; and wherein said platform is adapted to support the bottom of said trash bag.

14. A portable utility stand in accordance with claim 13, wherein said bag attachment section comprises four tubular members which are connected together to form a four-sided support defining said opening; wherein two of said tubular members include shanks projecting outwardly therefrom, and wherein the other two of said tubular members slidably engage said shanks and are secured thereto by means of pins.

15. A portable utility stand in accordance with claim 13, wherein said chute member includes a lower portion which is adapted to rest on said bag attachment section when said chute member is in said first position; and wherein said back wall member of said chute member includes a recess which is adapted to receive said lid member when said lid member is in its said open position.

16. A portable utility stand in accordance with claim 15, wherein said lower portion of said chute member includes ridge members which are adapted to rest on said bag attachment section when said chute member is in said first position to thereby secure the top of said trash bag to said bag attachment section.

17. A portable utility stand in accordance with claim 13, further comprising a latch member carried by said lid member, said latch member being adapted to detachably secure said lid member to said bag attachment section when said lid member is in said closed position.

18. A portable utility stand in accordance with claim 13, further comprising a handle member secured to said frame member.

19. A portable utility stand in accordance with claim 13, wherein said frame member, said leg members, and said platform are each composed of tubular members.

20. A portable utility stand in accordance with claim 13, further comprising a brace member connected between two of said leg members, said brace member including two ends, wherein each said end includes a tubular coupling which is adapted to slidably engage a said leg member.

21. A portable utility stand in accordance with claim 13, further comprising a clip member secured to said chute member, wherein said clip member is adapted to latch said chute member to said bag attachment section when said chute member is in its first position.

* * * * *